US009037799B2

(12) United States Patent
Biswas et al.

(10) Patent No.: US 9,037,799 B2
(45) Date of Patent: May 19, 2015

(54) REBUILD OF REDUNDANT SECONDARY STORAGE CACHE

(71) Applicant: LSI Corporation, San Jose, CA (US)

(72) Inventors: Sujan Biswas, Kolkata (IN); Karimulla Sheik, Bangalore (IN); Sumanesh Samanta, Bangalore (IN); Debal K. Mridha, Bangalore (IN); Naga S. Vadalamani, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 184 days.

(21) Appl. No.: 13/763,909

(22) Filed: Feb. 11, 2013

(65) Prior Publication Data

US 2014/0229676 A1    Aug. 14, 2014

(51) Int. Cl.
*G06F 12/00* (2006.01)
*G06F 12/08* (2006.01)
*G06F 11/16* (2006.01)

(52) U.S. Cl.
CPC ........ *G06F 12/0808* (2013.01); *G06F 11/1662* (2013.01); *G06F 11/1666* (2013.01)

(58) Field of Classification Search
None
See application file for complete search history.

(56) References Cited

U.S. PATENT DOCUMENTS

| | | | |
|---|---|---|---|
| 6,279,078 B1 | 8/2001 | Sicola et al. | |
| 6,571,324 B1 * | 5/2003 | Elkington et al. | 711/143 |
| 6,928,521 B1 * | 8/2005 | Burton et al. | 711/144 |
| 7,162,587 B2 | 1/2007 | Hiken et al. | |
| 8,650,328 B1 * | 2/2014 | Chatterjee et al. | 710/5 |
| 2004/0117562 A1 | 6/2004 | Wu et al. | |
| 2005/0177687 A1 * | 8/2005 | Rao | 711/3 |
| 2007/0150665 A1 | 6/2007 | Arimilli et al. | |
| 2008/0256298 A1 | 10/2008 | Lu et al. | |
| 2008/0307160 A1 * | 12/2008 | Humlicek | 711/143 |
| 2012/0124294 A1 * | 5/2012 | Atkisson et al. | 711/135 |
| 2013/0339786 A1 * | 12/2013 | Samanta et al. | 714/6.23 |
| 2014/0173330 A1 * | 6/2014 | Samanta et al. | 714/4.11 |

OTHER PUBLICATIONS

Daniel Dickerman; RAID Rebuilding; The 2007 Techo Forensics Conference; 2007.

* cited by examiner

*Primary Examiner* — Aimee Li
*Assistant Examiner* — Jason Blust
(74) *Attorney, Agent, or Firm* — Duft Bornsen & Fettig

(57) ABSTRACT

System and techniques for rebuilding a redundant secondary storage cache including a first storage device and a second storage device are described. A metadata entry indicative of a validity of a portion of information stored by a first storage cache device and associated with a region of a primary storage device is received. When the validity of the portion of information associated with the region of the primary storage device is established, a region lock is requested on the region of the primary storage device associated with the portion of information stored by the first storage cache device. Then, the portion of information and the corresponding metadata entry associated with the region of the primary storage device is copied from the first cache storage device to a second storage cache device to rebuild the second storage cache device.

20 Claims, 3 Drawing Sheets

REBUILD OF REDUNDANT SECONDARY STORAGE CACHE

FIELD OF THE INVENTION

The present disclosure is related to systems and techniques for rebuilding redundant secondary cache in a storage system.

BACKGROUND

Local solid state drive (SSD) caching can be used for secondary caching in storage architectures. Secondary caching devices in these configurations are typically redundant in order to reliably cache "dirty" data (e.g., data in a secondary cache that does reflect the contents of primary storage). When a redundant drive fails, however, a rebuild operation of the redundant drives can be complex and time consuming, because the same device can be caching data for different source Virtual Drives (VDs). An SSD volume may be rebuilt relatively easily offline with no background input/output (IO) being executed. However, this technique requires keeping the IO system offline for an extended time and is not suited for practical use cases that involve mission critical data, always 'on' systems, and so forth. A technique to avoid rebuild is to remove dirty data (e.g., flush dirty data from SSD cache to primary storage) from a surviving drive so that the data is not exchanged for rebuild. Once the dirty data has been removed (flushed), redundant storage of dirty data can be performed for subsequent write IOs. However, with SSDs having large storage capacities (e.g., on the order of terabytes of data), flushing dirty data to disk is highly time consuming and detrimental to performance, since a WRITE cache (dirty data generation) cannot restart unless the entirety of the dirty data is flushed to disk. This can be especially problematic in configurations where data is mirrored across multiple servers, e.g., where the entire dirty cache needs to be flushed every time a server is rebooted, even when a mirrored drive is absent from the storage system for only a small amount of time (as the corresponding server is rebooted).

SUMMARY

System and techniques for rebuilding a redundant secondary storage cache including a first storage device and a second storage device are described. A metadata entry indicative of a validity of a portion of information stored by a first storage cache device and associated with a region of a primary storage device is received. When the validity of the portion of information associated with the region of the primary storage device is established, a region lock is requested on the region of the primary storage device associated with the portion of information stored by the first storage cache device. Then, the portion of information and the corresponding metadata entry associated with the region of the primary storage device are copied from the first cache storage device to a second storage cache device to rebuild the second storage cache device. In embodiments, a watermark is maintained signifying the level to which rebuild is done. IO above the watermark is cached and treated as if hitting a redundant online secondary cache.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

Other embodiments of the disclosure will become apparent.

DETAILED DESCRIPTION

Figure 1:
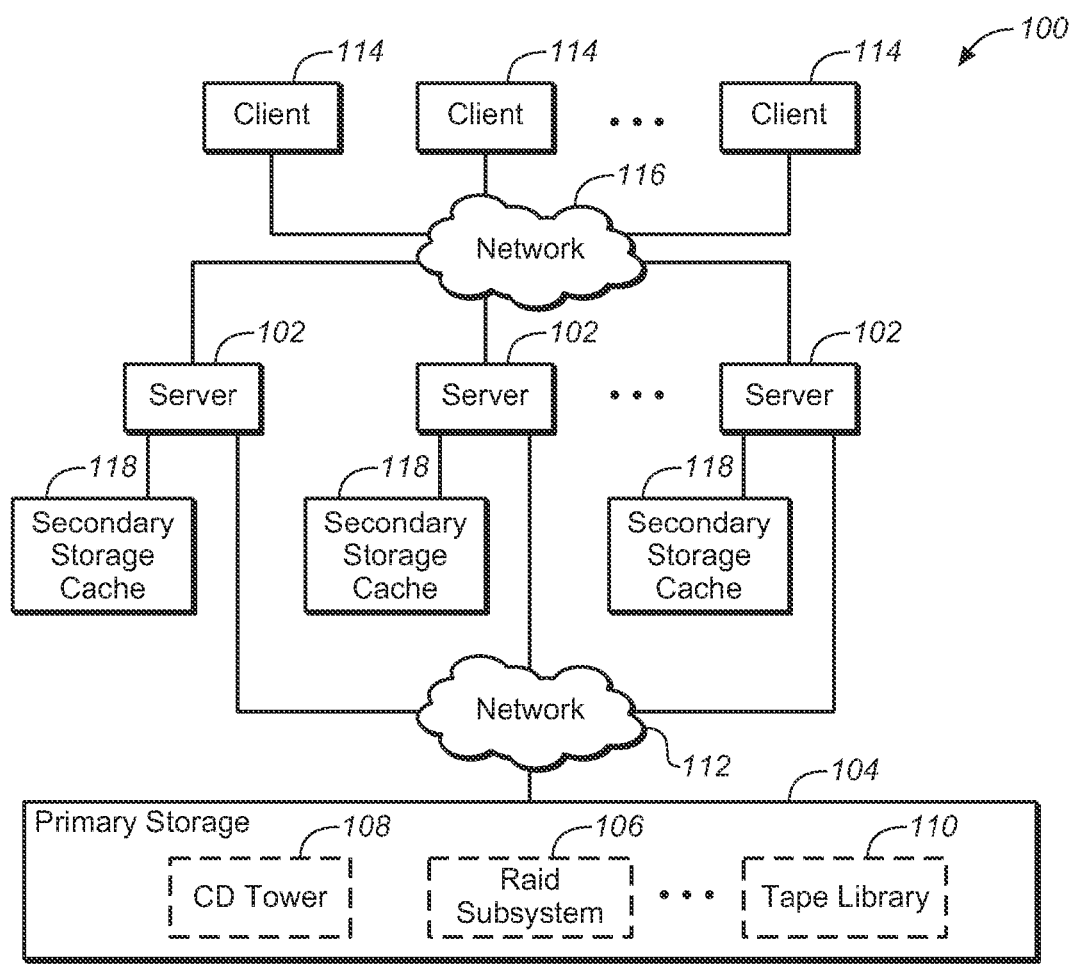
FIG. 1 is a block diagram illustrating a system that provides primary data storage to clients, where the system implements a redundant secondary storage cache in accordance with example embodiments of the present disclosure.
Figure 2:
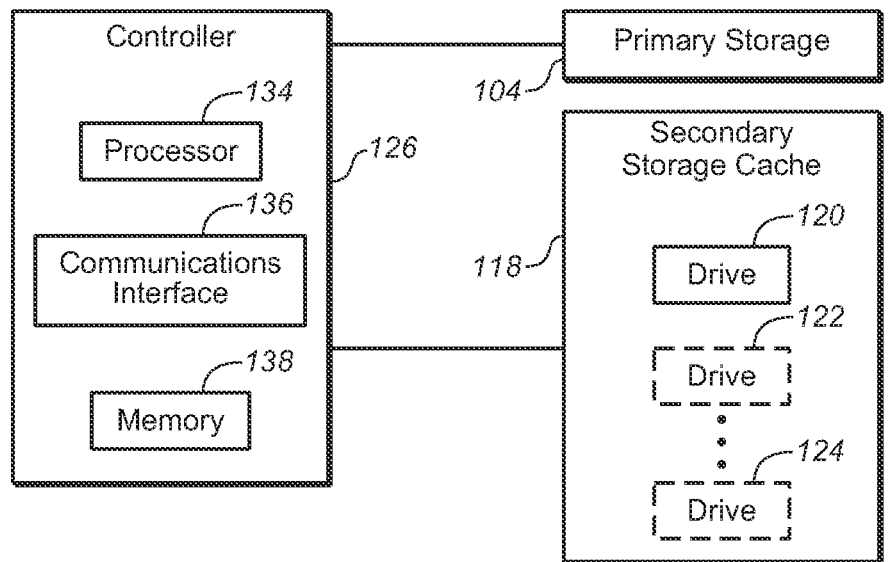
FIG. 2 is a block diagram illustrating a single controller for a data storage system that implements a redundant secondary storage cache, such as the system illustrated in FIG. 1, in accordance with example embodiments of the present disclosure.
Figure 3:
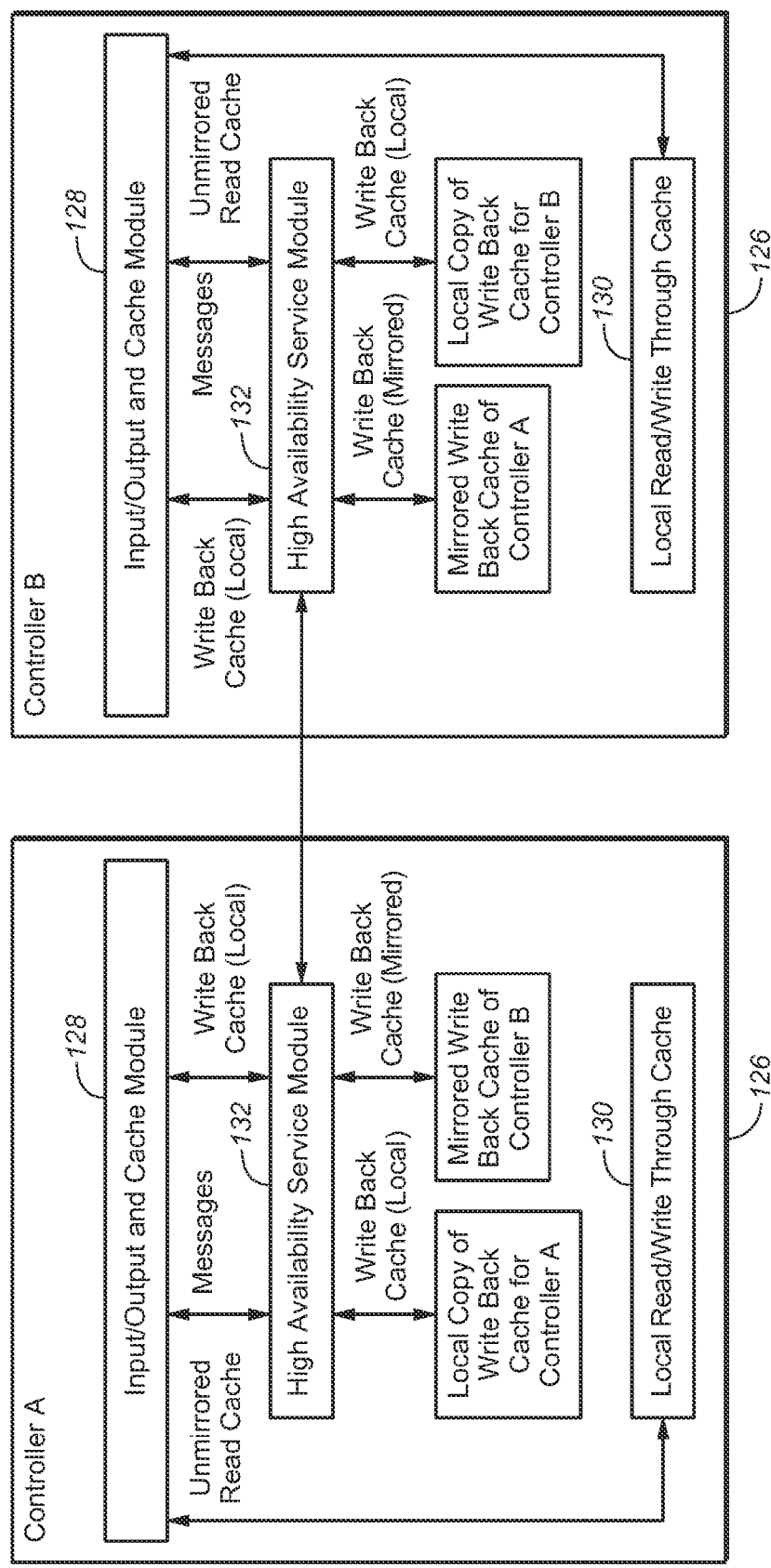
FIG. 3 is a block diagram illustrating two controllers for a data storage system that implements a redundant secondary storage cache, such as the system illustrated in FIG. 1, where a first controller is connected to a second controller to implement mirroring of write back data in accordance with example embodiments of the present disclosure.

Referring generally to FIGS. 1 through 3, a system 100 is described. The system 100 includes one or more information handling system devices (e.g., servers 102) connected to a storage device (e.g., primary storage 104). In embodiments of the disclosure, primary storage 104 comprises one or more storage devices including, but not necessarily limited to: a redundant array of independent disks (RAID) subsystem device 106, a compact disk (CD) tower device 108, a tape library device 110, and so forth. However, these storage devices are provided by way of example only and are not meant to be restrictive of the present disclosure. Thus, other storage devices can be used with the system 100, such as a digital versatile disk (DVD) loader and tower device, and so forth.

In embodiments, one or more of the servers 102 is connected to primary storage 104 via a network 112 such as a storage area network (SAN) (e.g., a Serial Attached SCSI (SAS) network, a Fibre channel network, and so forth). For example, a server 102 is connected to primary storage 104 via one or more hubs, bridges, switches, and so forth. In embodiments of the disclosure, the system 100 is configured so that primary storage 104 provides block-level data storage to one or more clients 114. For example, one or more of the clients 114 is connected to a server 102 via a network 116, such as a local area network (LAN) (e.g., an Ethernet network), and a server 102 is configured so that a storage device included in primary storage 104 is used for data storage by a client 114.

One or more of the servers 102 includes and/or is coupled with a secondary storage cache 118. The secondary storage cache 118 is configured to provide local caching to a server 102. In this manner, the secondary storage cache 118 decreases latency and/or increases the number of available input/output operations per second (IOPS) by caching data received from and/or directed to primary storage 104 (e.g., rather than directing all data from a server 102 through, for example, a switch fabric to primary storage 104 and then back to the server 102). For example, data to be written back to primary storage 104 is collected in the secondary storage cache 118 until cache blocks containing the data are about to be modified and/or replaced by new content, at which time the data is written back to primary storage 104.

The secondary storage cache 118 includes one or more data storage devices. For example, the secondary storage cache 118 includes a drive 120, and possibly one or more additional drives, such as a drive 122, a drive 124, and so forth. In embodiments of the disclosure, one or more of the drives 120, 122, and/or 124 comprises a storage device such as a solid state drive (SSD). However, a SSD is provided by way of example only and is not meant to be restrictive of the present disclosure. Thus, in other embodiments, one or more of the drives 120, 122, and/or 124 can be another data storage device. The secondary storage cache 118 provides redundant data storage. For example, the secondary storage cache 118 is configured using a data mirroring and/or protecting technique including, but not necessarily limited to: RAID 1, RAID 5, RAID 6, and so forth. In this manner, dirty write back data (write back data that is not yet committed to primary storage 104) is protected in the secondary storage cache 118.

In some embodiments, data stored on the drive 120 is duplicated on the drive 122 (and possibly the drive 124, and so forth) to provide data redundancy. In these embodiments, the secondary storage cache 118 provides protection against drive failure at a server level. However, this example is not meant to be restrictive of the present disclosure. In other embodiments, data is mirrored across multiple servers 102. For instance, two or more servers 102 can mirror data using a drive 120 included with each secondary storage cache 118 associated with each server 102. In this manner, if one server fails, data can be recovered from another server. Additionally, data redundancy can be provided at both the server level and across multiple servers. For example, two or more servers 102 can mirror data using a drive 120, a drive 122, and possibly additional drives (e.g., a drive 124) included with each secondary storage cache 118 associated with each server 102. In this example, data stored on a drive 120 is duplicated on a drive 122 (and possibly a drive 124, and so forth) at the server level, and data is also mirrored across multiple secondary storage caches 118 associated with multiple servers 102. Thus, it will be understood that the word "redundant" as used herein with respect to a storage device of a secondary storage cache 118 shall refer to a storage device associated with the same server as another storage device, a storage device associated with a different server as another device, and so forth.

Referring now to FIGS. 2 and 3, a controller 126 for system 100 includes an IO and cache module 128. The IO and cache module 128 is communicatively coupled to a local READ/write through (WT) cache 130. The READ/write through cache 130 is configured to be updated with new data along with primary storage 104 (e.g., when a write operation is directed to a region that is already cached in read cache). The IO and cache module 128 is also communicatively coupled to a high availability service module 132. The IO and cache module 128 transmits and receives messages and local write back cache data to and from the high availability service module 132. In embodiments of the disclosure, the high availability service module 132 stores and retrieves the local write back cache data using a local copy of the write back cache data for the controller 126. The controller 126 is communicatively coupled to a redundant controller 126, which is also configured to store and retrieve local write back cache data using a local copy of the write back cache data. For example, the high availability service module 132 of one controller 126 is connected to the high availability service module 132 of another controller 126 via a serial attached small computer system interface (SCSI) link. In this configuration, the two controllers 126 mirror their dirty write back data on one another, so that the failure of one results in the availability of data on the other. For example, one controller 126 stores and retrieves mirrored write back cache data for the other controller 126, and the other controller 126 stores and retrieves mirrored write back cache data for the first controller 126 (e.g., as shown in FIG. 3).

A controller 126, including some or all of its components, can operate under computer control. For example, a processor 134 can be included with or in a controller 126 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A processor 134 provides processing functionality for the controller 126 and can include any number of processors, micro-controllers, or other processing systems, and resident or external memory for storing data and other information accessed or generated by the system 100. The processor 134 can execute one or more software programs that implement techniques described herein. The processor 134 is not limited by the materials from which it is formed or the processing mechanisms employed therein and, as such, can be implemented via semiconductor(s) and/or transistors (e.g., using electronic integrated circuit (IC) components), and so forth.

The controller 126 includes a communications interface 136. The communications interface 136 is operatively configured to communicate with components of the system 100. For example, the communications interface 136 can be configured to transmit data for storage in the system 100, retrieve data from storage in the system 100, and so forth. The communications interface 136 is also communicatively coupled with the processor 134 to facilitate data transfer between components of the system 100 and the processor 134 (e.g., for communicating inputs to the processor 134 received from a device communicatively coupled with the system 100). It should be noted that while the communications interface 136 is described as a component of a system 100, one or more components of the communications interface 136 can be implemented as external components communicatively coupled to the system 100 via a wired and/or wireless connection.

The communications interface 136 and/or the processor 134 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 136 can be configured to communicate with a single network or multiple networks across different access points.

The controller 126 also includes a memory 138. The memory 138 is an example Of a tangible, computer-readable storage medium that provides storage functionality to store various data associated with operation of the controller 126, such as software programs and/or code segments, or other data to instruct the processor 134, and possibly other components of the controller 126, to perform the functionality described herein. Thus, the memory 138 can store data, such as a program of instructions for operating the controller 126 (including its components), and so forth. It should be noted that while a single memory 138 is described, a wide variety of types and combinations of memory (e.g., tangible, non-transitory memory) can be employed. The memory 138 can be integral with the processor 134, can comprise stand-alone memory, or can be a combination of both. The memory 138 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth.

Figure 4:
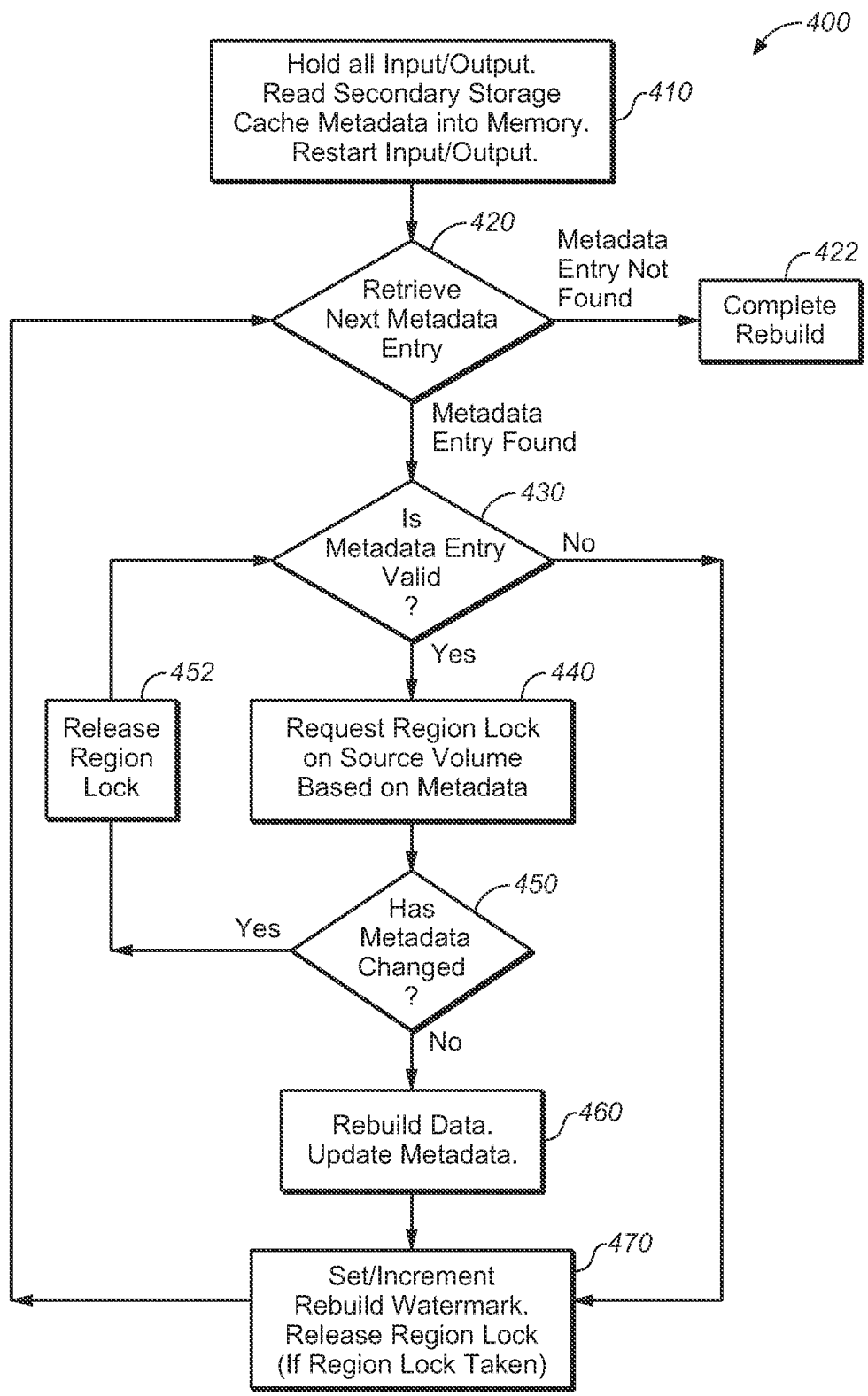
FIG. 4 is a flow diagram illustrating a method for rebuilding a secondary storage cache in a system that provides primary data storage to clients in accordance with example embodiments of the present disclosure.

Referring now to FIG. 4, example techniques are described for rebuilding a secondary storage cache for a system that provides primary data storage to a number of clients. FIG. 4 depicts a process 400, in an example embodiment, for rebuilding a secondary storage cache, such as the secondary storage cache 118 illustrated in FIGS. 1 through 3 and described above. The secondary storage cache 118 is rebuilt when, for instance, a drive of the secondary storage cache fails and is replaced by another drive, when a drive is absent from caching operations for some time (e.g., due to a server shutdown) and returns later, and so forth. In embodiments of the disclosure, the secondary storage cache 118 is rebuilt while input/output is running on a source volume. Further, the rebuild operation is performed only on data as needed (e.g., only on portions of a storage volume that store dirty cache write back data).

In embodiments of the disclosure, metadata is stored in a storage volume. The metadata is indicative of the validity of information stored in the secondary storage cache 118, and also includes source volume (e.g., source VD) and corresponding logical block address (LBA) information associated with the information in the secondary storage cache 118. This information is used to initiate a region lock on, for example, a source VD. In embodiments of the disclosure, the metadata can also include information such as, but not necessarily limited to: the number of times a region of storage is accessed, a cache type (e.g., a WRITE cache, READ cache/WT cache, and so on). In some embodiments, the metadata is stored separately from the cached data (e.g., at a separate location), and the layout of the metadata is predetermined (e.g., sequential). For instance, metadata for a first window is the first metadata entry in a metadata layout, and so on. The secondary storage cache metadata includes information about data in a storage volume that is valid, and which source volume(s) the data is associated with. The rebuild operation uses the metadata to avoid region lock on a storage volume. In some embodiments, the metadata is also used to perform a selective rebuild of the secondary storage cache and/or to accelerate a rebuild operation based upon valid data that is present.

In the process 400 illustrated, input/output is held, metadata from a secondary storage cache is read into memory, and then input/output is restarted (Block 410). For example, with reference to FIGS. 1 through 3, all input/output is held for one or more storage volumes (e.g., drives 120, 122, and/or 124) by taking a global command block. The metadata is read into memory 138. In some embodiments, the processor 134 includes control programming to synchronize data in memory 138 with changes to data in a storage volume and/or update memory 138 with persistent metadata. Input/output operations for the drives 120, 122, and/or 124 are then restarted by releasing the global command block.

Next, a metadata entry is retrieved (Decision Block 420). With continuing reference to FIGS. 1 through 3, each metadata entry stored in memory 138 can be accessed sequentially. If a metadata entry is not found, process 400 proceeds to complete the rebuild of the secondary storage cache (Block 422). When a metadata entry is found, process 400 proceeds to examine the validity of the metadata entry (Decision Block 430). If the metadata entry is not valid, process 400 proceeds to set/increment a rebuild watermark (Block 470). For instance, the associated region of the storage volume is skipped. If the metadata entry is valid, process 400 proceeds to request a region lock on a source volume based upon the metadata (Block 440). For example, process 400 determines the source volume and corresponding logical block address (LBA) from the metadata and requests a region lock on the source volume based on the metadata entry.

Then, the metadata is examined (Decision Block 450). If the metadata has changed, process 400 proceeds to release the region lock (Block 452) and then examine the validity of the metadata entry (Decision Block 430). If the metadata has not changed, process 400 proceeds to rebuild the data and then update the metadata (Block 460). For example, with reference to FIGS. 1 through 3, data is rebuilt on a mirror arm of the secondary storage cache 118, and then the mirror arm metadata is updated. Next, a rebuild watermark is set/increased and then the region lock is released (Block 470). Process 400 then proceeds to retrieve the next metadata entry (Decision Block 420).

During the execution of process 400 regular input/output operations can continue to execute in the background, and for all input/output operations above the rebuild watermark, the storage volume is treated as online, while below the rebuild watermark the storage volume is treated as degraded. Thus, the rebuild is performed on a metadata record-by-metadata record basis, and while a particular metadata record is being processed, a lock on the source VD is taken that holds any input/output destined for that particular record (e.g., both at a metadata level and an LBA level). By performing the rebuild operation based on the metadata associated with the cached data, a region lock can be taken on the logical volume to which the data belongs (e.g., rather than taking a region lock on the cache volume itself). Further, a selective rebuild is performed on only a portion of the storage volume that has redundant dirty write back cache data. This increases IO performance and reduces the rebuild time for the secondary storage cache (e.g., especially when a rebuild operation is performed across multiple servers).

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In embodiments of the disclosure that manifest in the form of integrated circuits, the various blocks discussed in the above disclosure can be implemented as integrated circuits along with other functionality. Such integrated circuits can include all of the functions of a given block, system, or circuit, or a portion of the functions of the block, system or circuit. Further, elements of the blocks, systems, or circuits can be implemented across multiple integrated circuits. Such integrated circuits can comprise various integrated circuits including, but not necessarily limited to: a system on a chip (SoC), a monolithic integrated circuit, a flip chip integrated circuit, a multichip module integrated circuit, and/or a mixed signal integrated circuit. In embodiments of the disclosure that manifest in the form of software, the various blocks discussed in the above disclosure represent executable instructions (e.g., program code) that perform specified tasks when executed on a processor. These executable instructions can be stored in one or more tangible computer readable media. In some such embodiments, the entire system, block or circuit can be implemented using its software or firmware equivalent. In some embodiments, one part of a given system, block or circuit can be implemented in software or firmware, while other parts are implemented in hardware.

Although embodiments of the disclosure have been described in language specific to structural features and/or methodological acts, it is to be understood that the subject matter defined in the appended claims is not necessarily limited to the specific embodiments described. Although various configurations are discussed, the apparatus, systems, subsystems, components and so forth can be constructed in a variety of ways without departing from teachings of this disclosure. Rather, the specific features and acts are disclosed as embodiments of implementing the claims.

What is claimed is:

1. A system for rebuilding a redundant secondary storage cache comprising a first storage device and a second storage device, the system comprising:
    a processor configured to receive a metadata entry indicating whether information stored by a first storage cache device and associated with a portion of a primary storage device is valid, wherein valid information is dirty cache data for writing back to the primary storage device; and
    a memory configured to store the metadata entry, the memory having computer executable instructions stored thereon, the computer executable instructions configured for execution by the processor to:
    determine the validity of the information associated with the portion of the primary storage device, and
    if the information is valid:
        request a region lock on the portion of the primary storage device associated with the information, and
        copy the information and the corresponding metadata entry from the first storage cache device to the second storage cache device to rebuild the second storage cache device while the region lock is applied, and
    if the information is not valid:
        forego region locking for the portion of the primary storage device associated with the information.

2. The system as recited in claim 1, wherein the first storage cache device and the second storage cache device are associated with a single information handling system device.

3. The system as recited in claim 1, wherein the first storage cache device and the second storage cache device are associated with different information handling system devices.

4. The system as recited in claim 1, wherein a serial attached small computer system interface link is used to connect the first storage cache device to the second storage cache device.

5. The system as recited in claim 1, wherein the primary storage device comprises a redundant array of independent disks device.

6. The system as recited in claim 1, wherein the redundant secondary storage cache is coupled with the primary storage device via a storage area network.

7. The system as recited in claim 1, wherein the system is fabricated in an integrated circuit.

8. A non-transitory computer-readable storage medium having computer executable instructions for rebuilding a redundant secondary storage cache comprising a first storage device and a second storage device, the computer executable instructions comprising:
    receiving a metadata entry indicating whether information stored by a first storage cache device and associated with a portion of a primary storage device is valid, wherein valid information is dirty cache data for writing back to the primary storage device;
    if the information is valid, requesting a region lock on the portion of the primary storage device associated with the information stored by the first storage cache device, and copying the information and the corresponding metadata entry associated with the portion of the primary storage device from the first storage cache device to a second storage cache device to rebuild the second storage cache device while the region lock is applied; and
    if the information is not valid, foregoing region locking for the portion of the primary storage device associated with the information.

9. The computer-readable storage medium as recited in claim 8, wherein the first storage cache device and the second storage cache device are associated with a single information handling system device.

10. The computer-readable storage medium as recited in claim 8, wherein the first storage cache device and the second storage cache device are associated with different information handling system devices.

11. The computer-readable storage medium as recited in claim 10, wherein a serial attached small computer system interface link is used to connect the first storage cache device to the second storage cache device.

12. The computer-readable storage medium as recited in claim 8, wherein the primary storage device comprises a redundant array of independent disks device.

13. The computer-readable storage medium as recited in claim 8, wherein the redundant secondary storage cache is coupled with the primary storage device via a storage area network.

14. The computer-readable storage medium as recited in claim 8, the computer executable instructions further comprising:
    after requesting the region lock on the portion of the primary storage device associated with the information stored by the first storage cache device, receiving an indication that the metadata entry has changed;
    releasing the region lock on the portion of the primary storage device associated with the information stored by the first storage cache device; and
    receiving a subsequent metadata entry indicative of a validity of other information stored by the first storage cache device and associated with the portion of the primary storage device.

15. A computer-implemented method for rebuilding a redundant secondary storage cache comprising a first storage device and a second storage device, the computer-implemented method comprising:
    receiving a metadata entry indicating whether information stored by a first storage cache device and associated with a portion of a primary storage device is valid, wherein valid information is dirty cache data for writing back to the primary storage device;
    if the information is valid:
        requesting a region lock on the portion of the primary storage device associated with the information stored by the first storage cache device;

when an indication that the metadata entry has changed is received after requesting the region lock on the portion of the primary storage device associated with the information stored by the first storage cache device, releasing the region lock on the portion of the primary storage device associated with the information stored by the first storage cache device; and when an indication that the metadata entry has changed is not received after requesting the region lock on the portion of the primary storage device associated with the information stored by the first storage cache device, causing a processor to copy the information and the corresponding metadata entry associated with the portion of the primary storage device from the first storage cache device to a second storage cache device to rebuild the second storage cache device; and if the information is not valid:
  foregoing region locking for the portion of the primary storage device associated with the information.

16. The computer-implemented method as recited in claim 15, wherein the first storage cache device and the second storage cache device are associated with a single information handling system device.

17. The computer-implemented method as recited in claim 15, wherein the first storage cache device and the second storage cache device are associated with different information handling system devices.

18. The computer-implemented method as recited in claim 15, further comprising connecting the first storage cache device to the second storage cache device using a serial attached small computer system interface link.

19. The computer-implemented method as recited in claim 15, wherein the primary storage device comprises a redundant array of independent disks device.

20. The computer-implemented method as recited in claim 15, further comprising coupling the redundant secondary storage cache with the primary storage device via a storage area network.

* * * * *